(12) United States Patent
Wei

(10) Patent No.: US 9,965,072 B1
(45) Date of Patent: May 8, 2018

(54) QUICK RESPONSE LIQUID CRYSTAL DISPLAY DEVICE AND MANUFACTURING METHOD THEREOF

(71) Applicant: Shenzhen China Star Optoelectronics Technology Co., Ltd., Shenzhen (CN)

(72) Inventor: Hongquan Wei, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 122 days.

(21) Appl. No.: 15/112,194

(22) PCT Filed: May 19, 2016

(86) PCT No.: PCT/CN2016/082673
§ 371 (c)(1),
(2) Date: Jul. 18, 2016

(87) PCT Pub. No.: WO2017/177506
PCT Pub. Date: Oct. 19, 2017

(30) Foreign Application Priority Data

Apr. 13, 2016 (CN) .......................... 2016 1 0230831

(51) Int. Cl.
| | | |
|---|---|---|
| *G02F 1/139* | (2006.01) |
| *G06F 3/041* | (2006.01) |
| *C09K 19/46* | (2006.01) |
| *C09K 19/44* | (2006.01) |
| *G02F 1/1362* | (2006.01) |
| *G02F 1/1337* | (2006.01) |
| *G02F 1/1343* | (2006.01) |
| *G02F 1/1345* | (2006.01) |
| *G09G 3/36* | (2006.01) |

(52) U.S. Cl.
CPC ............ *G06F 3/0412* (2013.01); *C09K 19/44* (2013.01); *C09K 19/46* (2013.01); *G02F 1/1345* (2013.01); *G02F 1/133707* (2013.01); *G02F 1/134309* (2013.01); *G02F 1/136286* (2013.01); *G09G 3/3611* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,714,819 B2 * | 5/2010 | Kawaguchi | ......... | G02F 1/13306 345/204 |
| 2003/0048402 A1 * | 3/2003 | Konno | .............. | G02F 1/136286 349/141 |

* cited by examiner

*Primary Examiner* — Van N Chow
(74) *Attorney, Agent, or Firm* — Leong C. Lei

(57) ABSTRACT

The invention provides a quick response LCD device and manufacturing method thereof. The LCD device uses field sequential backlight module to realize color display and eliminates color films in conventional LCD panel to achieve high transmittance and color purity; a polymer liquid crystal layer (28) is disposed in LCD panel (2), the polymer liquid crystal layer (28) comprises a polymer network (281) formed by polymerizable monomers and liquid crystal (282) anchored by the polymer network (281) to stay in bend state without electricity and in homeotropic state when electricity applied. The warm-up process of the conventional OCB mode is omitted to achieve quick response.

13 Claims, 4 Drawing Sheets

QUICK RESPONSE LIQUID CRYSTAL DISPLAY DEVICE AND MANUFACTURING METHOD THEREOF

BACKGROUND OF THE INVENTION

1. Field of the Invention

The present invention relates to the field of liquid crystal display (LCD), and in particular to a quick response LCD device and manufacturing method thereof.

2. The Related Arts

The liquid crystal display (LCD) shows the advantages of thinness, low power-consumption, no radiation, and so on, and is widely used in applications, such as, LCTV, mobile phone, personal digital assistant (PDA), digital camera, notebook PC, desktop PC, and so on, and become the mainstream display technology.

The LCD device usually includes a case, an LCD panel disposed inside the case and a backlight module disposed inside the case.

The conventional LCD panel includes a color filter (CF), a thin film transistor (TFT) array substrate, and a liquid crystal layer sandwiched between CF and the TFT array substrate. The conventional LCD device realizes color display by using CF coated with color resists, such as, blue, green and red, to filter the monochrome light (usually white light) provided by the backlight module. In general, a red sub-pixel, a green sub-pixel and a blue sub-pixel are used to form a pixel. Because of the filtering of the color resists, a CF can only allows ⅓ of the light to pass through, which greatly lowers the transmittance of the LCD panel.

Another approach to realize color display is to eliminate the CF of the LCD panel and uses a backlight module based on field sequential (FS) display mode, where the backlight source emits a red light, a green light and a blue light sequentially in time. As such, the corresponding pixel realizes the transmittance change through the liquid crystal. Utilizing the persistence of vision characteristics of human eyes, the colors are mixed according to the time so as to realize color display. The FS display does not use CF, and therefore can achieve higher transmittance in display. Also, the color is formed by directly mixing the lights from the backlight source, the color purity is higher. However, the frequency requirement for FS display mode is three times higher than the conventional LCD, and places higher demands on the response speed of the liquid crystal.

Furthermore, a display mode, called optically compensated birefringence (OCB), shows quick response. However, the OCB mode requires a very slow warm-up process, which restricts the application on the FS display device. As shown in FIG. 1, the slowness of the warm-up process of the OCB mode is because, when applying an electrical field to the liquid crystal layer 100, the liquid crystal molecule 101 must transform from a splay state to an asymmetric splay state, and then to a bend state, while the effective process of the real OCB mode needs the liquid crystal molecule 101 to switch between bend state and homeotropic state and vice versa.

SUMMARY OF THE INVENTION

The object of the present invention is to provide an LCD device, making the liquid crystal molecules stay in the bend state to accelerate the response and providing high transmittance and high color purity.

Another object of the present invention is to provide a manufacturing method of an LCD device. The LCD device manufactured by the method can make the liquid crystal molecules stay in the bend state to accelerate the response and provide high transmittance and high color purity.

To achieve the above object, the present invention provides an LCD device, which comprises a field sequential backlight module, and an LCD panel disposed at the backlight module;

the LCD panel further comprising an upper substrate, a lower substrate, disposed opposite to the upper substrate, an upper alignment film and a lower alignment film, disposed respectively on the opposite inner side of the upper substrate and the low substrate, an upper polarizer and a lower polarizer, disposed respectively on the respective outer side of the upper substrate and the lower substrate, and a polymer liquid crystal layer, disposed between the upper alignment film and the lower alignment film;

the polymer liquid crystal layer comprising a polymer network formed by polymerizable monomers, and liquid crystal anchored by the polymer network to stay in the bend state when no electricity applied, and in the homeotropic state when electricity applied;

the field sequential backlight module comprising at least an LED set having red, green and blue LEDs, and the LED set sequentially emitting light in accordance with field sequential alternating loop.

The weight of polymerizable monomers, before polymerization, is between 0.1%-40% of composition formed by the polymerizable monomers and the liquid crystal.

The polymerizable monomers comprise one or more unsaturated double-bond functional groups; the polymerizable monomers are one or more combinations of an acrylate and derivatives thereof, methacrylates and derivatives thereof, styrene and derivatives thereof, aliphatic amine epoxy resin and epoxy curing agent.

The field sequential backlight module drives the LED set at the frequencies of 120 HZ or 240 HZ, and the red, green, blue LED sets are arranged in the repetitive format of red LED, green LED and blue LED, or in the repetitive format of red LED, green LED, red LED and blue LED.

The liquid crystal is nematic liquid crystal.

The present invention also provides a manufacturing method of quick response LCD device, which comprises the steps of:

Step 1: providing an upper substrate and a lower substrate, coating and curing an upper alignment film and a lower alignment film respectively on the facing inner side of the upper substrate and the lower substrate, and performing rubbing alignment or optical alignment on the upper alignment film and the lower alignment film;

Step 2: mixing polymerizable monomers and liquid crystal to obtain a composition of polymerizable monomers and liquid crystal;

Step 3: coating a sealant on the upper substrate or the lower substrate, dripping the composition of polymerizable monomers and liquid crystal into the space formed by the sealant, attaching the upper substrate to the lower substrate, and then curing the sealant;

Step 4: applying a voltage to make the liquid crystal in the composition of polymerizable monomers and liquid crystal transforming to the splay state to the bend state, when stabilized, radiating UV to make the polymerizable monomers polymerized to form polymer network to anchor the liquid crystal;

Step 5: after scribing and braking, attaching an upper polarizer and a lower polarizer respectively to the corresponding outer sides of the upper substrate and the lower substrate to obtain an LCD panel; and Step 6: providing a field sequential backlight module, and assembling the LCD panel and the field sequential backlight module to obtain the LCD device;

wherein the field sequential backlight module comprising at least an LED set having red, green and blue LEDs, and the LED set sequentially emitting light in accordance with field sequential alternating loop.

In Step 2, the weight of polymerizable monomers, before polymerization, is between 0.1%-40% of composition formed by the polymerizable monomers and the liquid crystal.

The polymerizable monomers comprise one or more unsaturated double-bond functional groups; the polymerizable monomers are one or more combinations of an acrylate and derivatives thereof, methacrylates and derivatives thereof, styrene and derivatives thereof, aliphatic amine epoxy resin and epoxy curing agent.

In Step 4, the UV has a wavelength of 280-400 nm.

The liquid crystal is nematic liquid crystal.

The present invention also provides a manufacturing method of quick response LCD device, which comprises the steps of:

Step 1: providing an upper substrate and a lower substrate, coating and curing an upper alignment film and a lower alignment film respectively on the facing inner side of the upper substrate and the lower substrate, and performing rubbing alignment or optical alignment on the upper alignment film and the lower alignment film;

Step 2: mixing polymerizable monomers and liquid crystal to obtain a composition of polymerizable monomers and liquid crystal;

Step 3: coating a sealant on the upper substrate or the lower substrate, dripping the composition of polymerizable monomers and liquid crystal into the space formed by the sealant, attaching the upper substrate to the lower substrate, and then curing the sealant;

Step 4: applying a voltage to make the liquid crystal in the composition of polymerizable monomers and liquid crystal transforming to the splay state to the bend state, when stabilized, radiating UV to make the polymerizable monomers polymerized to form polymer network to anchor the liquid crystal;

Step 5: after scribing and braking, attaching an upper polarizer and a lower polarizer respectively to the corresponding outer sides of the upper substrate and the lower substrate to obtain an LCD panel; and Step 6: providing a field sequential backlight module, and assembling the LCD panel and the field sequential backlight module to obtain the LCD device;

wherein the field sequential backlight module comprising at least an LED set having red, green and blue LEDs, and the LED set sequentially emitting light in accordance with field sequential alternating loop;

in Step 2, the weight of polymerizable monomers, before polymerization, is between 0.1%-40% of composition formed by the polymerizable monomers and the liquid crystal; and in Step 4, the UV has a wavelength of 280-400 nm.

Compared to the known techniques, the present invention provides the following advantages: the present invention provides an LCD device, disposed with field sequential backlight module to realize color display and eliminating the color filter in the conventional LCD panel to achieve high transmittance and high color purity; disposing polymer liquid crystal layer in the LCD panel, and the polymer liquid crystal layer comprising the polymer network formed by polymerization of the polymerizable monomers and the liquid crystal anchored by the polymer network in the bend state when no electricity is applied while in the homeotropic state when electricity is applied, so as to omit the warm-up process in the known OCB mode and greatly accelerate the response. The present invention provides a manufacturing method, wherein the liquid crystal in the composition of polymerizable monomers and liquid crystal transform form the splay state to the bend state during the process of manufacturing the LCD panel; and after stabilized, the UV is used to radiate the polymerizable monomers to react and form a polymer network to anchor the liquid crystal. Also, by using the field sequential backlight module with the LCD panel, an LCD device able to keep the liquid crystal molecules in the bend state is obtained to accelerate response and provides high transmittance and high color purity.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
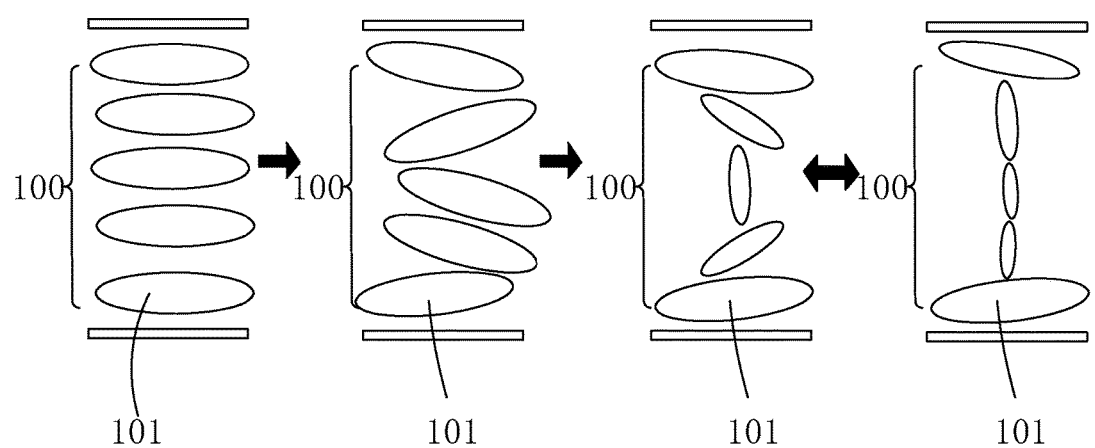
FIG. 1 is a schematic view showing state change of liquid crystal molecules in a known OCB mode display process.
Figure 2:
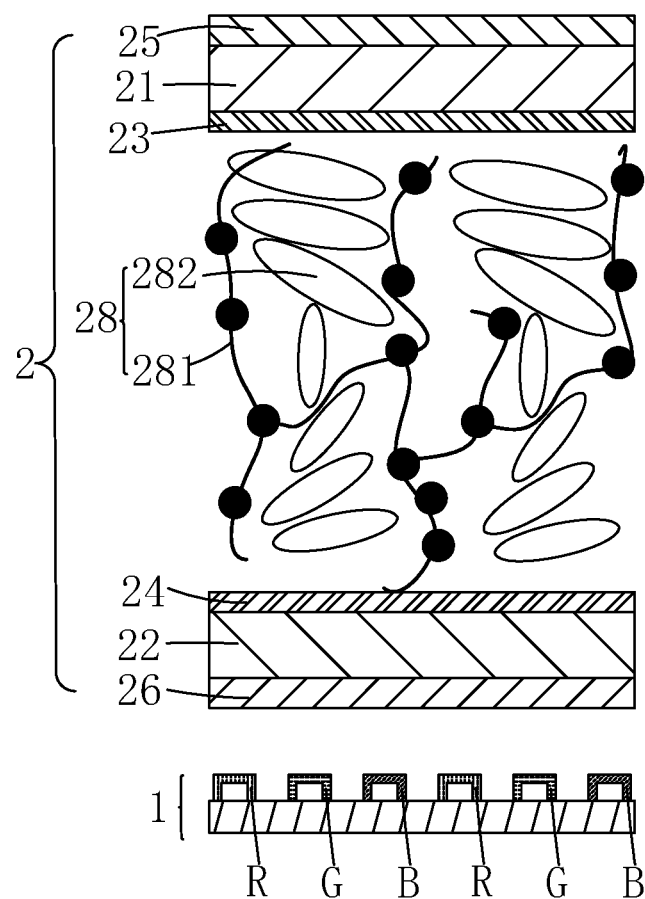
FIG. 2 is a schematic view showing the structure of a quick response LCD device provided by an embodiment of the present invention.
Figure 3:
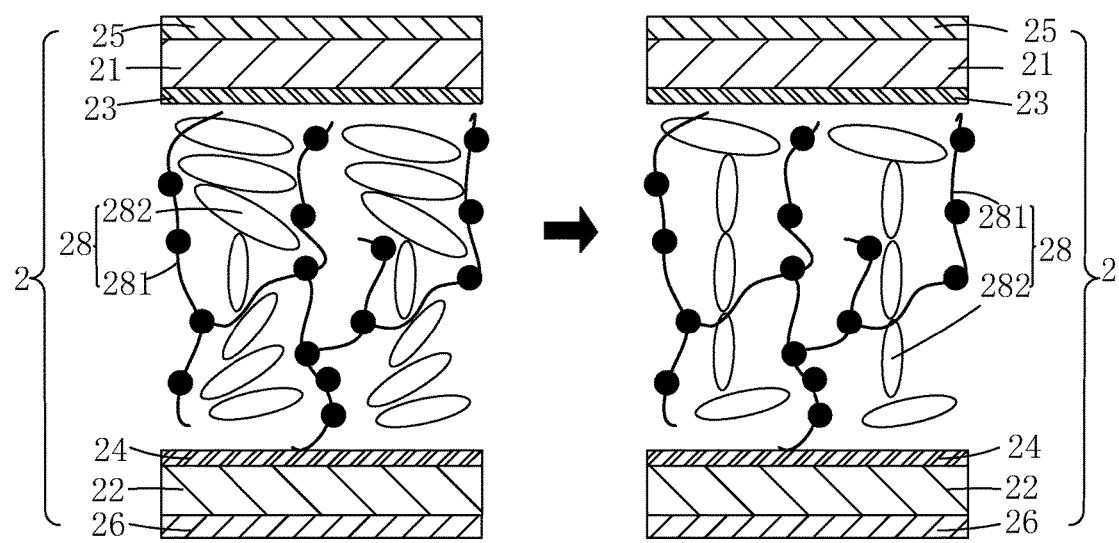
FIG. 3 is a schematic view showing the LCD panel of the quick response LCD device before and after applying electricity provided by an embodiment of the present invention.

Refer to FIG. 2 and FIG. 3. The present invention provides a quick response LCD device, comprising: a field sequential backlight module 1, an LCD panel 2 disposed at the field sequential backlight module 1.

The field sequential backlight module 1 at comprises a light-emitting diode (LED) set, having red, green and blue LEDs, and the LED set emits light according to the field sequential alternating loop. The LED set may further comprise white LEDs, yellow LEDs and cyan LEDs.

The LCD panel 2 further comprises an upper substrate 21, a lower substrate 22, disposed opposite to the upper substrate 21, an upper alignment film 23 and a lower alignment film 24, disposed respectively on the facing inner side of the upper substrate 21 and the low substrate 22, an upper polarizer 25 and a lower polarizer 26, disposed respectively on the respective outer side of the upper substrate 21 and the lower substrate 22, and a polymer liquid crystal layer 28 disposed between the upper alignment film 23 and the lower alignment film 24. The polymer liquid crystal layer 28 comprises a polymer network 281 formed by polymerizable monomers, and liquid crystal 282 anchored by the polymer network 281 to stay in the bend state when no electricity applied, and in the homeotropic state when electricity applied.

Specifically, take the field sequential backlight module 1 comprising a three-color (RGB) LED set as example, as shown in FIG. 2. The LED set is arranged in the repetitive format of red LED R, green LED G, and blue LED B; alternatively, the layout arrangement is in the repetitive format of red LED R, green LED G, red LED R, and blue LED B (not shown). Each color of the LED set must have a light-emitting cycle less or equal to the persistence of vision in human eye so as to form a color image. The persistence of vision is about 1/60 seconds, and therefore, the LED set of the field sequential backlight module 1 must be driven at a frequency of 120 HZ or 240 HZ to realize color display.

The lower substrate 22 is equivalent to the TFT array substrate in known technology. Because the quick response LCD device of the present invention uses the field sequential backlight module to realize color display, the upper substrate 21 does not require color resists, as opposed to the known technology. By eliminating the CF in the known LCD panel, the quick response LCD device of the present invention provides high transmittance and high color purity.

The liquid crystal 282 is preferably the nematic liquid crystal. The nematic liquid crystal molecules are rod-shaped molecules, the centroid of the molecule has a long-range ordering, and the molecules are arranged as a bundle of chopsticks, with vertical arrangement in neat rows, but horizontal arrangement allowed irregularity. The molecules are in splay state when no electricity is applied, but in bend state with electricity applied.

The weight of polymerizable monomers, before polymerization, is between 0.1%-40% of composition formed by the polymerizable monomers and the liquid crystal 282. Furthermore, the polymerizable monomers comprise one or more unsaturated double-bond functional groups; the polymerizable monomers are one or more combinations of an acrylate and derivatives thereof, methacrylates and derivatives thereof, styrene and derivatives thereof, aliphatic amine epoxy resin and epoxy curing agent.

The polymer network 281 formed by polymerizable monomers after reaction provides a strong anchor power to the liquid crystal 282 so that the liquid crystal 282 can stay in bend state without applying electricity. By switching between not applying and applying electricity to the LCD device of the present invention, the liquid crystal 282 will transform directly from the bend state to the homeotropic state. Compared to the known OCB mode, the slow warm-up process of the transition from the splay state to the asymmetric splay state, and then to the bend state is omitted to accelerate the response time.

The operation of the quick response LCD device of the present invention is as follows: in the first field sequence of the first frame, the field sequential backlight module 1 drives one of the red LEDs R, the green LEDs G and the blue LEDs B to emit light of the corresponding color, and the corresponding TFT switch is driven at the same time to supply the voltage to the corresponding pixel. The liquid crystal 282 quickly responds, and the corresponding pixel can achieve the target luminance. Similarly, the second and third field sequences of the first frame, the field sequential backlight module 1 drives respectively the remaining two of the red LEDs R, the green LEDs G and the blue LEDs B to emit light of the corresponding color. With persistence of vision in human eyes, the colors are mixed to display color images.

Figure 4:
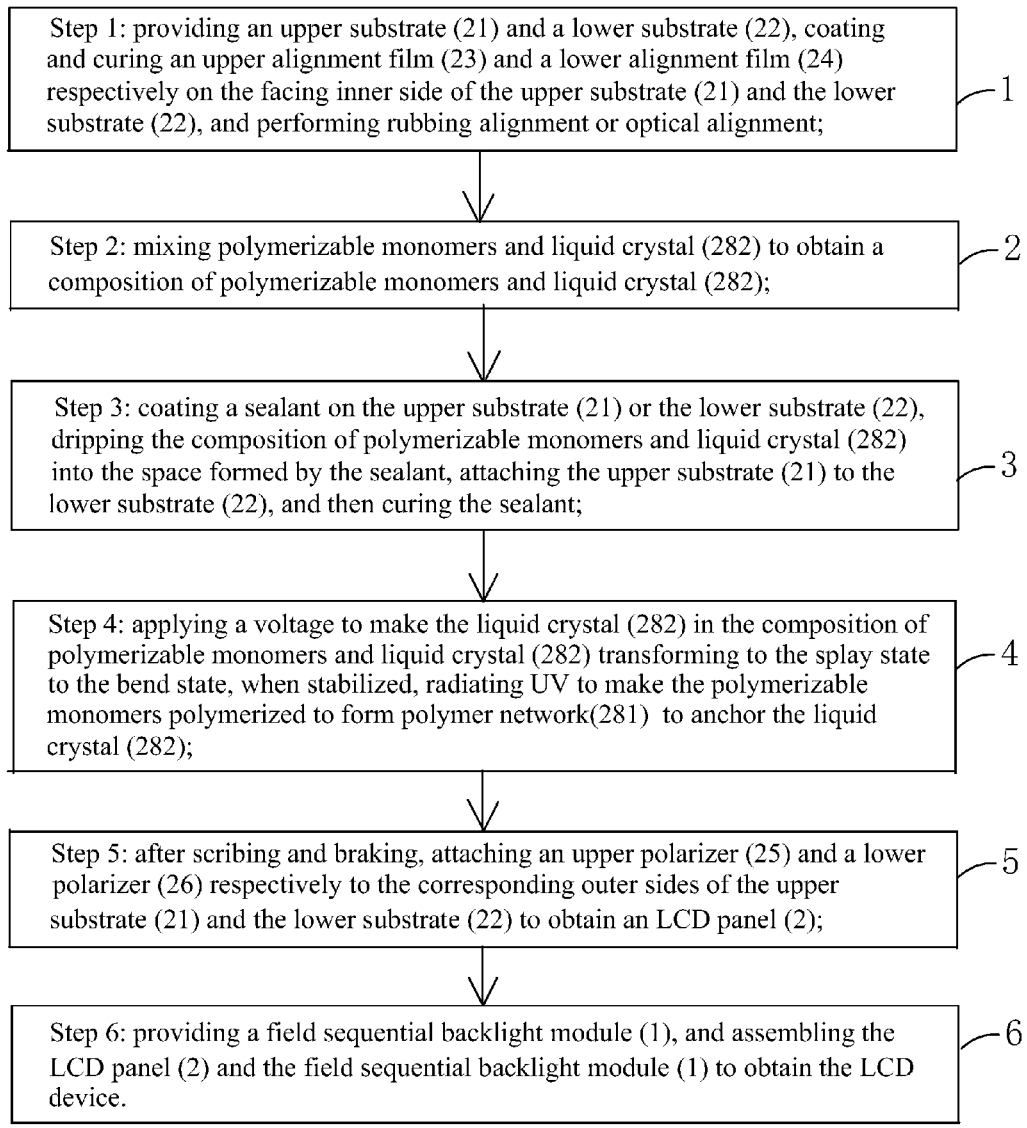
FIG. 4 is a flowchart showing the manufacturing method of the quick response LCD device provided by an embodiment of the present invention.

Refer to FIG. 4, as well FIG. 2 and FIG. 3. The present invention also provides a manufacturing method of quick response LCD device, which comprises the following steps:

Step 1: providing an upper substrate 21 and a lower substrate 22, coating and curing an upper alignment film 23 and a lower alignment film 24 respectively on the facing inner side of the upper substrate 21 and the lower substrate 22, and performing rubbing alignment or optical alignment on the upper alignment film 23 and the lower alignment film 24.

In Step 1, the rubbing alignment treatment on the upper alignment film 23 and the lower alignment film 24 can perform the horizontal alignment on liquid crystal dripped into in the subsequent step so that the liquid crystal shows a pre-tilt angle of 2-30°.

Specifically, the lower substrate 22 is equivalent to the TFT array substrate in known technology. Compared to known technology, the upper substrate 21 does not require color resists, and the quick response LCD device of the present invention provides high transmittance and high color purity.

Step 2: mixing polymerizable monomers and liquid crystal 282 to obtain a composition of polymerizable monomers and liquid crystal 282.

Specifically, the weight of polymerizable monomers, before polymerization, is between 0.1%-40% of composition formed by the polymerizable monomers and the liquid crystal 282. Furthermore, the polymerizable monomers comprise one or more unsaturated double-bond functional groups; the polymerizable monomers are one or more combinations of an acrylate and derivatives thereof, methacrylates and derivatives thereof, styrene and derivatives thereof, aliphatic amine epoxy resin and epoxy curing agent.

The polymer network 281 formed by polymerizable monomers after reaction provides a strong anchor power to the liquid crystal 282 so that the liquid crystal 282 can stay in bend state without applying electricity. By switching between not applying and applying electricity to the LCD device of the present invention, the liquid crystal 282 will transform directly from the bend state to the homeotropic state. Compared to the known OCB mode, the slow warm-up process of the transition from the splay state to the asymmetric splay state, and then to the bend state is omitted to accelerate the response time.

Step 3: coating a sealant on the upper substrate 21 or the lower substrate 22, dripping the composition of polymerizable monomers and liquid crystal 282 into the space formed by the sealant, attaching the upper substrate 21 to the lower substrate 22, and then curing the sealant.

Specifically, in Step 3, the liquid cell formed after dripping the composition of the polymerizable monomers and the liquid crystal 282 is 1-20 um.

Step 4: applying a voltage to make the liquid crystal 282 in the composition of polymerizable monomers and liquid crystal 282 transforming to the splay state to the bend state, when stabilized, radiating UV to make the polymerizable monomers polymerized to form polymer network 281 to anchor the liquid crystal 282.

Specifically, the wavelength of the UV used in Step 4 is 280-400 nm.

Step 5: after scribing and braking, attaching an upper polarizer 25 and a lower polarizer 26 respectively to the corresponding outer sides of the upper substrate 21 and the lower substrate 22 to obtain an LCD panel 2.

Step 6: providing a field sequential backlight module 1, and assembling the LCD panel 2 and the field sequential backlight module to obtain the LCD device.

The field sequential backlight module 1 comprises at least an LED set having red, green and blue LEDs, and the LED set sequentially emitting light in accordance with field sequential alternating loop.

In the LCD device manufactured by the abovementioned method, the polymer liquid crystal layer 28 of the LCD panel 2 comprises the polymer network 281 and liquid crystal 282. The polymer network 281 formed by polymerizable monomers after reaction provides a strong anchor power to the liquid crystal 282 so that the liquid crystal 282 can stay in bend state without applying electricity. By switching between not applying and applying electricity to the LCD device of the present invention, the liquid crystal 282 will transform directly from the bend state to the homeotropic state. Compared to the known OCB mode, the slow warm-up process of the transition from the splay state to the asymmetric splay state, and then to the bend state is omitted to accelerate the response time.

Moreover, the manufactured LCD device uses field sequential backlight module 1 to realize color display, and compared to known technology, the upper substrate 21 does not require color resists and the CF in the conventional LCD panel is eliminated, hence the quick response LCD device of the present invention provides high transmittance and high color purity.

In summary, the present invention provides an LCD device, disposed with field sequential backlight module to realize color display and eliminating the color filter in the conventional LCD panel to achieve high transmittance and high color purity; disposing polymer liquid crystal layer in the LCD panel, and the polymer liquid crystal layer comprising the polymer network formed by polymerization of the polymerizable monomers and the liquid crystal anchored by the polymer network in the bend state when no electricity is applied while in the homeotropic state when electricity is applied, so as to omit the warm-up process in the known OCB mode and greatly accelerate the response. The present invention provides a manufacturing method, wherein the liquid crystal in the composition of polymerizable monomers and liquid crystal transform form the splay state to the bend state during the process of manufacturing the LCD panel; and after stabilized, the UV is used to radiate the polymerizable monomers to react and form a polymer network to anchor the liquid crystal. Also, by using the field sequential backlight module with the LCD panel, an LCD device able to keep the liquid crystal molecules in the bend state is obtained to accelerate response and provides high transmittance and high color purity.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A quick response liquid crystal display (LCD) device, which comprises a field sequential backlight module, and an LCD panel disposed at the backlight module;
    the LCD panel further comprising an upper substrate, a lower substrate disposed opposite to the upper substrate, an upper alignment film and a lower alignment film, disposed respectively on the facing inner sides of the upper substrate and the low substrate, an upper polarizer and a lower polarizer, disposed respectively on the respective outer sides of the upper substrate and the lower substrate, and a polymer liquid crystal layer, disposed between the upper alignment film and the lower alignment film; the polymer liquid crystal layer comprising a polymer network formed by polymerizable monomers, and liquid crystal anchored by the polymer network to stay in the bend state when no electricity applied, and in the homeotropic state when electricity applied; and
    the field sequential backlight module comprising at least an LED set having red, green and blue LEDs, and the LED set sequentially emitting light in accordance with field sequential alternating loop.

2. The quick response LCD device as claimed in claim 1, wherein the weight of polymerizable monomers, before polymerization, is between 0.1%-40% of composition formed by the polymerizable monomers and the liquid crystal.

3. The quick response LCD device as claimed in claim 2, wherein the polymerizable monomers comprise one or more unsaturated double-bond functional groups; the polymerizable monomers are one or more combinations of an acrylate and derivatives thereof, methacrylates and derivatives thereof, styrene and derivatives thereof, aliphatic amine epoxy resin and epoxy curing agent.

4. The quick response LCD device as claimed in claim 1, wherein the field sequential backlight module drives the LED set at the frequencies of 120 HZ or 240 HZ, and the red, green, blue LED sets are arranged in the repetitive format of red LED, green LED and blue LED, or in the repetitive format of red LED, green LED, red LED and blue LED.

5. The quick response LCD device as claimed in claim 1, wherein the liquid crystal is nematic liquid crystal.

6. A manufacturing method of quick response liquid crystal display (LCD) device, which comprises the following steps of:
    Step 1: providing an upper substrate and a lower substrate, coating and curing an upper alignment film and a lower alignment film respectively on the facing inner side of the upper substrate and the lower substrate, and performing rubbing alignment or optical alignment on the upper alignment film and the lower alignment film;
    Step 2: mixing polymerizable monomers and liquid crystal to obtain a composition of polymerizable monomers and liquid crystal;
    Step 3: coating a sealant on the upper substrate or the lower substrate, dripping the composition of polymerizable monomers and liquid crystal into the space formed by the sealant, attaching the upper substrate to the lower substrate, and then curing the sealant;
    Step 4: applying a voltage to make the liquid crystal in the composition of polymerizable monomers and liquid crystal transforming to the splay state to the bend state, when stabilized, radiating UV to make the polymerizable monomers polymerized to form polymer network to anchor the liquid crystal;

Step 5: after scribing and braking, attaching an upper polarizer and a lower polarizer respectively to the corresponding outer sides of the upper substrate and the lower substrate to obtain an LCD panel; and Step 6: providing a field sequential backlight module, and assembling the LCD panel and the field sequential backlight module to obtain the LCD device;

wherein the field sequential backlight module comprising at least an LED set having red, green and blue LEDs, and the LED set sequentially emitting light in accordance with field sequential alternating loop.

7. The manufacturing method of quick response LCD device as claimed in claim 6, wherein in Step 2, the weight of polymerizable monomers, before polymerization, is between 0.1%-40% of composition formed by the polymerizable monomers and the liquid crystal.

8. The manufacturing method of quick response LCD device as claimed in claim 7, wherein the polymerizable monomers comprise one or more unsaturated double-bond functional groups; the polymerizable monomers are one or more combinations of an acrylate and derivatives thereof, methacrylates and derivatives thereof, styrene and derivatives thereof, aliphatic amine epoxy resin and epoxy curing agent.

9. The manufacturing method of quick response LCD device as claimed in claim 6, wherein the field sequential backlight module drives the LED set at the frequencies of 120 HZ or 240 HZ, and the red, green, blue LED sets are arranged in the repetitive format of red LED, green LED and blue LED, or in the repetitive format of red LED, green LED, red LED and blue LED.

10. The manufacturing method of quick response LCD device as claimed in claim 6, wherein the liquid crystal is nematic liquid crystal.

11. A manufacturing method of quick response liquid crystal display (LCD) device, which comprises the following steps of:

Step 1: providing an upper substrate and a lower substrate, coating and curing an upper alignment film and a lower alignment film respectively on the facing inner side of the upper substrate and the lower substrate, and performing rubbing alignment or optical alignment on the upper alignment film and the lower alignment film;

Step 2: mixing polymerizable monomers and liquid crystal to obtain a composition of polymerizable monomers and liquid crystal;

Step 3: coating a sealant on the upper substrate or the lower substrate, dripping the composition of polymerizable monomers and liquid crystal into the space formed by the sealant, attaching the upper substrate to the lower substrate, and then curing the sealant;

Step 4: applying a voltage to make the liquid crystal in the composition of polymerizable monomers and liquid crystal transforming to the splay state to the bend state, when stabilized, radiating UV to make the polymerizable monomers polymerized to form polymer network to anchor the liquid crystal;

Step 5: after scribing and braking, attaching an upper polarizer and a lower polarizer respectively to the corresponding outer sides of the upper substrate and the lower substrate to obtain an LCD panel; and Step 6: providing a field sequential backlight module, and assembling the LCD panel and the field sequential backlight module to obtain the LCD device;

wherein the field sequential backlight module comprising at least an LED set having red, green and blue LEDs, and the LED set sequentially emitting light in accordance with field sequential alternating loop;

in Step 2, the weight of polymerizable monomers, before polymerization, is between 0.1%-40% of composition formed by the polymerizable monomers and the liquid crystal;

in Step 4, the wavelength of the UV is 280-400 nm.

12. The manufacturing method of quick response LCD device as claimed in claim 11, wherein the polymerizable monomers comprise one or more unsaturated double-bond functional groups; the polymerizable monomers are one or more combinations of an acrylate and derivatives thereof, methacrylates and derivatives thereof, styrene and derivatives thereof, aliphatic amine epoxy resin and epoxy curing agent.

13. The manufacturing method of quick response LCD device as claimed in claim 11, wherein the liquid crystal is nematic liquid crystal.

* * * * *